Patented Feb. 4, 1936

2,029,999

UNITED STATES PATENT OFFICE 2,029,999

PRINTING PREPARATION AND PROCESS

Fritz Grieshaber, Riehen, near Basel, Switzerland, assignor to the firm Society of Chemical Industry in Basle, Basel, Switzerland No Drawing. Application June 30, 1934, Serial No. 733,327. In Switzerland July 8, 1933

10 Claims. (Cl. 8—5)

This invention relates to a process of printing animal and vegetable fibers, such as, for example, cotton, artificial silk, wool and silk, with dyestuffs in which there is used as an auxiliary substance a body of the general formula

wherein R represents hydrogen, alkyl, phenyl or naphthyl, at least one of the two X's represents hydrogen or an organic residue free from carboxyl-groups and $n$ represents 1, 2 or 3.

Dyestuffs of very different classes may be printed by the process, provided they are suitable for the printing. For instance, dyestuffs of the following classes: indigoid, anthraquinoid and sulfur dyestuffs; also dyestuffs containing metal in complex combination; azo-dyestuffs; di- and tri-arylmethane dyestuffs; pyrazolene dyestuffs; acridine dyestuffs; quinoline dyestuffs; quinonimine-dyestuffs; azine-, oxazine- and thiazine-dyestuffs.

Bodies corresponding with the above general formula are, for example, alkyl-sulfamides, benzene-sulfamide, benzene-dialyklsulfamides, toluene-sulfamides, toluene-monomethylsulfamide, toluene-dimethylsulfamide, toluene-diethylsulfamide, mixtures of ortho- and para-toluene-sulfamide, dibenzene-sulfonamide of the formula

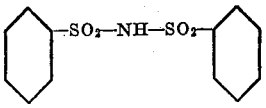

meta-aminobenzenesulfamide, halogenbenzenesulfamides, naphthalene-sulfamides, for example naphthalene - methylsulfamides, naphthalene-ethylsulfamides, naphthalenedisulfamides, naphthalene-trisulfamides, 1-hydroxynaphthalene-8-sulfamide, tetrahydro-naphthalene-sulfamides, benzenedisulfamides, as well as the salts, such as the sodium and potassium salts of the foregoing bodies; further, salts of sulfamides of the benzene and naphthalene series having in the nucleus sulfo-groups or carboxyl-groups, such as phthalic acid-sulfamide, hydroxybenzene-carboxylic acid-sulfamides.

The process may be applied to all kinds of textile printing on webs, yarn or loose materials, for instance in discharge printing or in direct printing, for instance in padding printing or any other kind of printing in which steaming follows the printing.

The body of the foregoing general formula may be incorporated with the printing paste or the dyestuff during or after the preparation thereof, for instance by mixing it or grinding it together with the dyestuff paste or with the dyestuff powder. It may also be added to the dyestuff preparation which is to be used in the printing. Such preparations are, for instance, those made from vat-dyestuffs which may contain the reduced or not reduced dyestuff, a water-soluble alcohol, for instance glycerin, ethylene-glycol, thiodiglycol, a hydrotropic agent, such as urea, a salt of an aromatic sulfonic or carboxylic acid; also a catalyst for reduction, such as anthraquinone, hydroxyanthraquinones or a salt of any of these, and further a reducing agent, such as sodium hydrosulfite, and finally an alkali, such as caustic potash, caustic soda, ammonium hydroxide, sodium carbonate, magnesium hydroxide or potassium carbonate.

Printing pastes which contain bodies of the above general formula are better fixed and the prints produced with these printing pastes have greater color strength and may be purer than is the case with prints obtained with the same dyestuff mixtures not containing the bodies in question. The favorable action of the auxiliary substances used in the invention is exhibited in the greatly improved effects in discharge printing. In many cases attainment of the best possible result depends on the proportion, the kind and the form of the auxiliary substance, and also on the dyestuff used.

The following examples illustrate the invention, the parts being by weight:—

Example 1

To 200 parts of an aqueous paste of 5:5'-dichloro-7:7'-dimethylthioindigo of the formula containing 34 parts of pure dyestuff and made by grinding the filter press-cake with water, are added with stirring 40 parts of glycerin and 20 parts of para-toluenesulfamide in the form of an aqueous paste of 50 per cent. strength. This mixture is evaporated at ordinary or reduced pressure until it constitutes 200 parts.

A printing color is made as follows:—

200 parts of the paste obtained as described above
70 parts of glycerin
500 parts of starch tragacanth British gum thickening
120 parts of potassium carbonate
100 parts of sodium formaldehyde-sulfoxylate
10 parts of water
———
1000 parts The color is printed on cotton, dried, steamed as usual in the Mather-Platt apparatus, rinsed and soaped at the boil.

The printing paste fixes better and the print is of greater color strength than is the case with a print produced in like manner but without the assistance of para-toluenesulfamide.

Like effects are produced when instead of 5:5'-dichloro-7:7'-dimethylthioindigo another vat-dyestuff, for example 1:2:2':1'-N-dihydro-anthraquinone-azine is used.

Still better results are obtained if the printing paste contains, besides para-toluenesulfamide, urea or a reduction catalyst, such as an hydroxy-anthraquinone, anthraquinone, or an anthra-quinone-sulfonic acid, or both the urea and the reduction catalyst.

Without essential influence on the effect, there may be used instead of the para-toluene sulfamide another sulfamide or benzoic acid-sulfamid. When instead of 5:5'-dichloro-7:7'-dimethylthioindigo there is used 2-thionaphthene-acenaphthene-indigo, and instead of para-toluenesulfamide there is used β-naphthalene-sulfamide or the potassium salt of 2-hydroxy-benzene-1-carboxylic acid-5-sulfamide there are also obtained dyestuff pastes which yield essentially better prints than are obtainable without these additions.

Example 2

To 83 parts of 4:4'-dimethyl-6:6'-dichloro-thioindigo of the formula

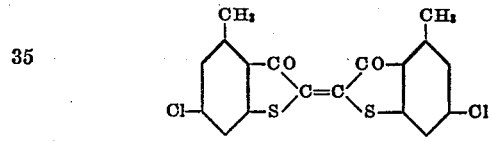

in the form of an aqueous paste containing 22 parts of pure dyestuff, there are added 50 parts of glycerin and 20 parts of para-toluenesulfamide, which has been brought to a fine state of subdivision by grinding it with a little water. The dyestuff in this paste is now reduced at a raised temperature by adding caustic soda and sodium hydrosulfite in the usual manner, and the paste is brought to a weight of 200 parts, ground and finely sifted.

The printing is conducted in the manner described in Example 1.

The printing paste is better fixed and the print obtained is purer as well as of greater color strength than is a print produced in like manner but without the assistance of paratoluenesulfamide.

Instead of the dyestuff prescribed in this example 2:1:2':1'-naphththioindigo can be used.

So also the para-toluenesulfamide may be substituted by another sulfamide; the proportion of the sulfamide may vary within wide limits.

Example 3

A printing color is made as follows:—
200 parts of the dyestuff obtainable by sulfurizing carbazoleindophenol, in the form of a paste of 20 per cent. strength,
70 parts of glycerin,
120 parts of potassium carbonate,
80 parts of 1-hydroxynaphthalene-8-sulfamide (aqueous paste of 50 per cent. strength),
430 parts of starch-tragacanth British gum thickening,
100 parts of sodium formaldehyde-sulfoxylate
_____
1000 parts.

The goods are printed, dried, steamed in the usual manner in the Mather-Platt apparatus, rinsed and soaped at the boil.

The print thus obtained is of greater color strength than one obtained in like manner but without the aid of the 1-hydroxynaphthalene-8-sulfamide.

Instead of the dyestuff used in this example the indigoid dyestuff from acenaphthenequinone and 3-hydroxythionaphthene or the anthraquinone-vat-dyestuff Cibanone Gold-orange 2R (Schultz, Farbstofftabellen, Leipzig, 1932, Vol. 2, page 62) may be used, and the sodium salt of the para-toluenesulfamide may take the place of the 1-hydroxynaphthalene-8-sulfamide.

The result of this printing can be further improved by addition of sodium benzylsulfanilate or urea to the printing color.

Example 4

20 parts of 4:4'-dimethyl-6:6'-dichloro-thioindigo, in the form of a filter-press-cake are ground together with 15 parts of para-toluenesulfamide and 14 parts of sulfite waste liquor (1:1) and the whole is dried. The powder thus obtained is then finely ground with 2 parts of calcined sodium carbonate and finely sifted.

If this powder is used in the usual manner in the production of a printing color, prints are obtained which are purer and of greater color strength than prints produced in like manner but without the use of para-toluenesulfamide.

Example 5

200 parts of filter press-cake, containing 33 parts of 2:1:2':1'-naphththioindigo of the formula

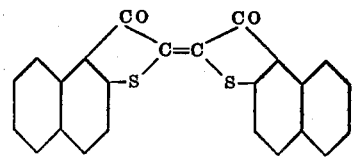

are ground with 24 parts of sulfite waste liquor of 50 per cent. strength and 0.8 part of hydroxy-anthraquinone, as well as 10 parts of soda ash and the mixture is evaporated under ordinary or diminished pressure to dryness. The dry residue is ground with 32.5 parts of the sodium salt of anhydrous para-toluenesulfamide and there are then further admixed 20 parts of sodium hydrosulfite of 80 per cent. strength.

The powder thus obtained is made into a printing color in the usual manner; the prints obtained are of greater color strength than those produced in like manner but without the use of the sodium salt of para-toluenesulfamide.

Example 6

A printing color is made as follows:—
200 parts of the indigoid dyestuff of the formula

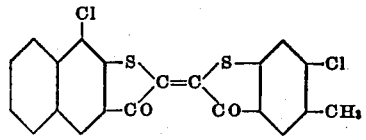

which is made, for example, by condensation of 2-(para-dimethylamine-)-anil from 5-methyl-6-chloro-3-hydroxythionaphthene with 1-chloro-2:3-naphthioindoxyl, in the form of a paste of 15 per cent. strength 70 parts of glycerin
420 parts of starch-tragacanth British gum thickening
100 parts of potassium carbonate
40 parts of caustic soda solution (30 per cent. strength)
40 parts of sodium hydrosulfite powder. This mixture is reduced by heating it at 50–70° C., and there are added
50 parts of sodium formaldehyde-sulfoxylate
80 parts of para-toluenesulfamide or tetrahydronaphthalenesulfamide in the form of an aqueous paste of 50 per cent. strength.
───
1000 parts.

The printing is conducted as described in Example 1.

The print thus obtained is purer and of greater color strength than one obtained in like manner but without the use of para-toluenesulfamide or tetrahydronaphthalenesulfamide.

Example 7

A printing color is made as follows:—

20 parts of the dyestuff of the formula

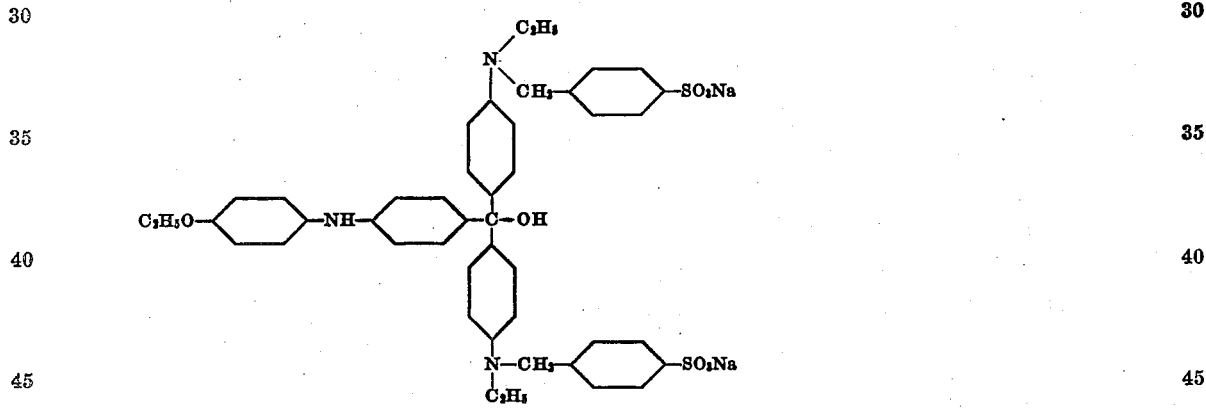

obtainable by condensing 1 mol. benzaldehyde with 2 mol. of ethylbenzylaniline, then trisulfonating, then oxidizing and treating with para-phenetidine.
220 parts of water.
50 parts of glycerin.
600 parts of British gum thickening 1:1.
60 parts of ammonium tartrate (20° Bé.).
50 parts of para-toluenesulfamide, in the form of an aqueous paste of 50 per cent. strength.
───
1000 parts.

The goods are printed, dried, steamed for three-quarters of an hour in a boiler and thoroughly washed.

The print obtained in this manner on silk (loaded or not loaded), wool (chlorinated or not chlorinated), or artificial silk from regenerated cellulose has a greater color strength than that obtained in like manner but without the aid of para-toluenesulfamide.

Like effects are obtained when for the triphenylmethane-dyestuffs prescribed in this example there is substituted another triphenylmethane-dyestuff or a dyestuff containing a metal in complex combination, for instance the chromium compound of the azo-dystuff from nitrated 1-diazo-2-hydroxynaphthalene-4-sulfonic acid and 2-hydroxynaphthalene, and, indeed, dyestuffs of the last-named kind may be used with or without a mordant, for instance chromium acetate.

Also in this example there may be substituted for the para-toluenesulfamide another sulfamide.

Example 8

A discharge printing paste is prepared as follows:—

600 parts of gum thickening 1:1.
200 parts of sodium formaldehyde sulfoxylate.
50 parts of glycerin.
100 parts of para-toluenesulfamide in the form of an aqueous paste of 50 per cent. strength.
50 parts of water.
───
1000 parts.

This discharge paste is printed on a cotton dyed with 5 per cent. of its weight of the dyestuff of the formula

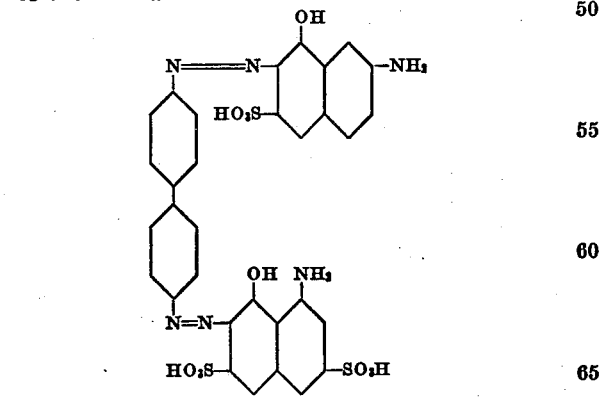

from tretrazotized benzidine and 1 mol. 2-amino-8-hydroxynaphthalene-6-sulfonic acid, as well as 1 mol. 1-amino-8-hydroxynaphthalene-3:6-disulfonic acid; the goods are then dried, steamed in the Mather-Platt apparatus and thoroughly rinsed.

The discharge effect thus produced is essentially better than one produced in like manner but without the use of paratoluenesulfamide.

What I claim is:—

1. A process of printing native or regenerated cellulose or animal fibers with dyestuffs, consisting in using as assistants bodies of the general formula

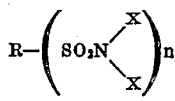

wherein R represents alkyl, phenyl or naphthyl, the two X's represent hydrogen or an alkyl group free from carboxyl-groups, and $n$ is 1, 2 or 3.

2. A process of printing native or regenerated cellulose or animal fibers with dyestuffs, consisting in using as assistants bodies of the general formula

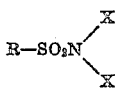

wherein R represents alkyl, phenyl or naphthyl and the two X's represent hydrogen or an alkyl group free from carboxyl-groups.

3. A process of printing native or regenerated cellulose or animal fibers with dyestuffs, consisting in using as assistants bodies of the general formula

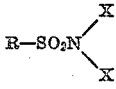

wherein R represents phenyl or naphthyl and the two X's represent hydrogen or an alkyl group free from carboxyl-groups.

4. A process of printing native or regenerated cellulose or animal fibers with dyestuffs, consisting in using as assistants bodies of the general formula

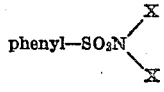

wherein the two X's represent hydrogen or an alkyl group free from carboxyl-groups.

5. A process of printing native or regenerated cellulose or animal fibers with dyestuffs, consisting in using as an assistant para-toluenesulfamide.

6. Printing preparations for printing native or regenerated cellulose or animal fibers containing a dyestuff and bodies of the general formula

wherein R represents alkyl, phenyl or naphthyl, the two X's represent hydrogen or an alkyl group free from carboxyl-groups, and $n$ is 1, 2 or 3.

7. Printing preparations for printing native or regenerated cellulose or animal fibers containing a dyestuff and bodies of the general formula

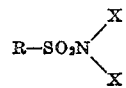

wherein R represents alkyl, phenyl or naphthyl and the two X's represent hydrogen or an alkyl group free from carboxyl-groups.

8. Printing preparations for printing native or regenerated cellulose or animal fibers containing a dyestuff and bodies of the general formula

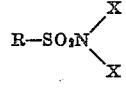

wherein R represents phenyl or naphthyl and the two X's represent hydrogen or an alkyl group free from carboxyl-groups.

9. Printing preparations for printing native or regenerated cellulose or animal fibers containing a dyestuff and bodies of the general formula

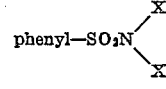

wherein the two X's represent hydrogen or an alkyl group free from carboxyl-groups.

10. A printing preparation for printing native or regenerated cellulose or animal fibers containing a dyestuff and para-toluenesulfamide.

FRITZ GRIESHABER.